May 9, 1961
J. P. WATSON
2,983,798
STEPPING MOTORS AND SWITCHES
Filed May 28, 1957
5 Sheets-Sheet 1
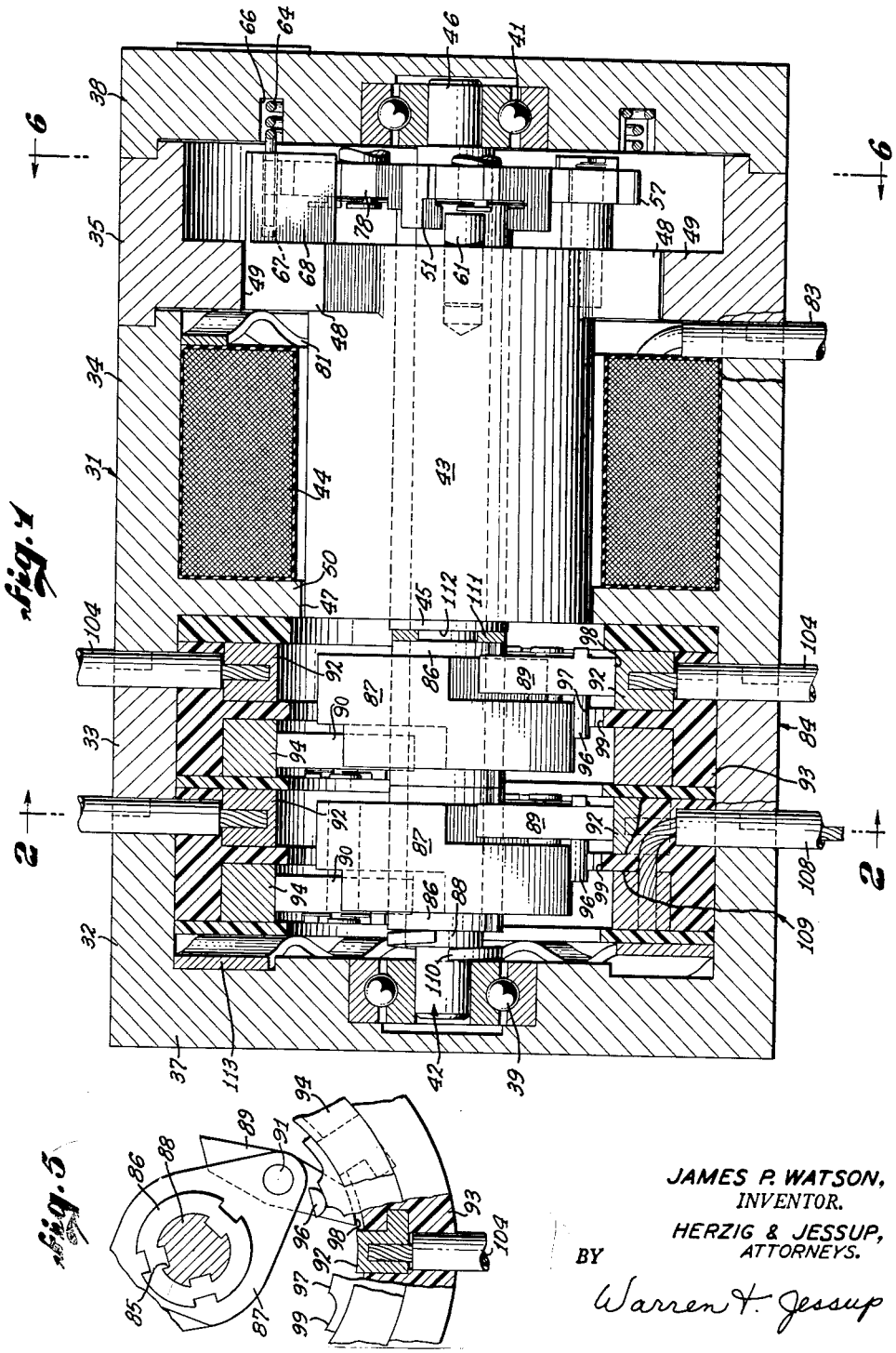
JAMES P. WATSON,
INVENTOR.
HERZIG & JESSUP,
BY   ATTORNEYS.
Warren H. Jessup May 9, 1961 J. P. WATSON 2,983,798
STEPPING MOTORS AND SWITCHES
Filed May 28, 1957 5 Sheets-Sheet 2
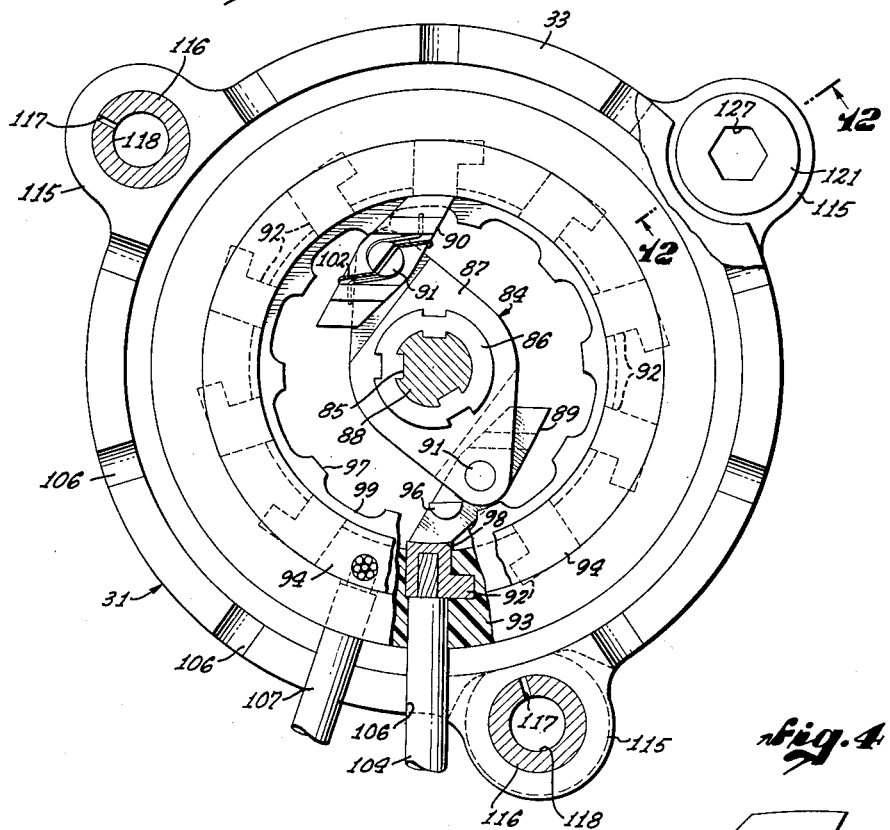
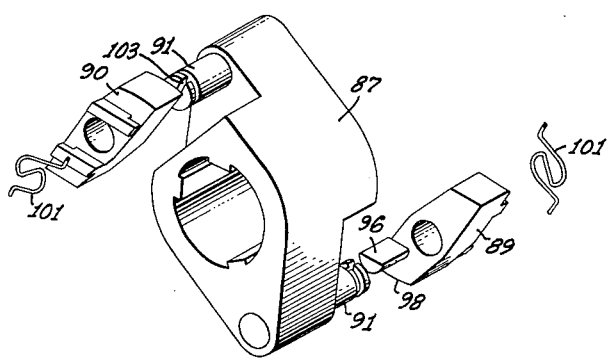
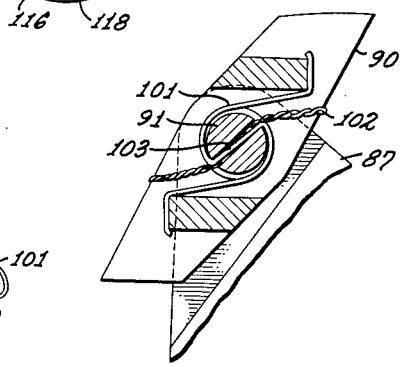
JAMES P. WATSON,
INVENTOR.
HERZIG & JESSUP,
BY ATTORNEYS.
Warren T. Jessup May 9, 1961 J. P. WATSON 2,983,798
STEPPING MOTORS AND SWITCHES
Filed May 28, 1957 5 Sheets-Sheet 3
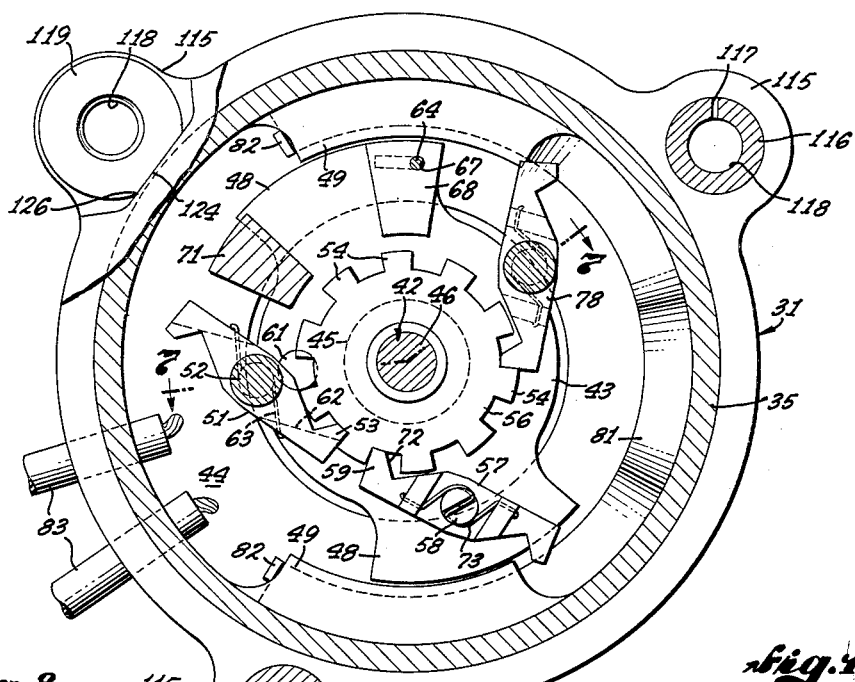
Fig. 6
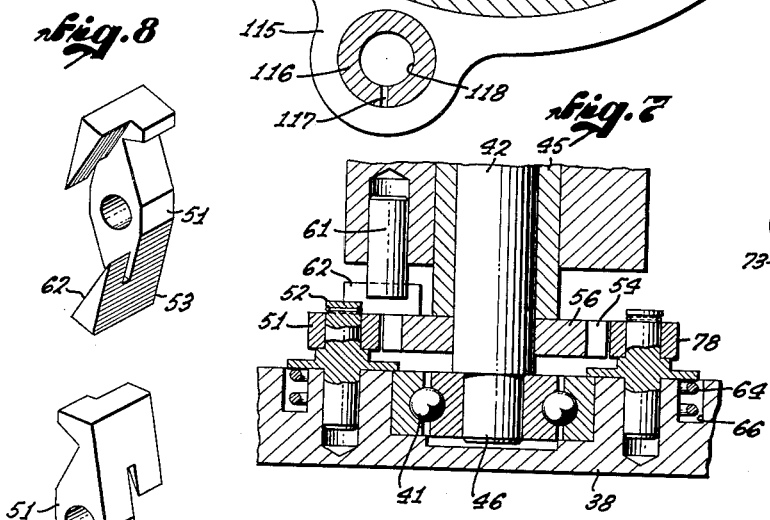
Fig. 8
Fig. 7
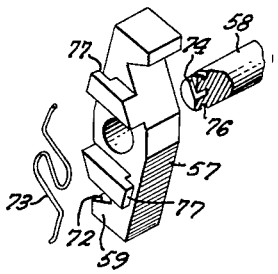
Fig. 10
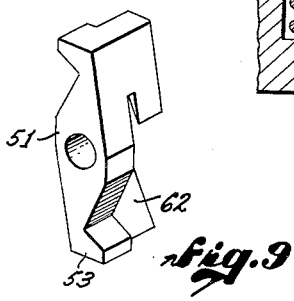
Fig. 9
JAMES P. WATSON,
INVENTOR.
HERZIG & JESSUP,
BY ATTORNEYS.
Warren T. Jessup

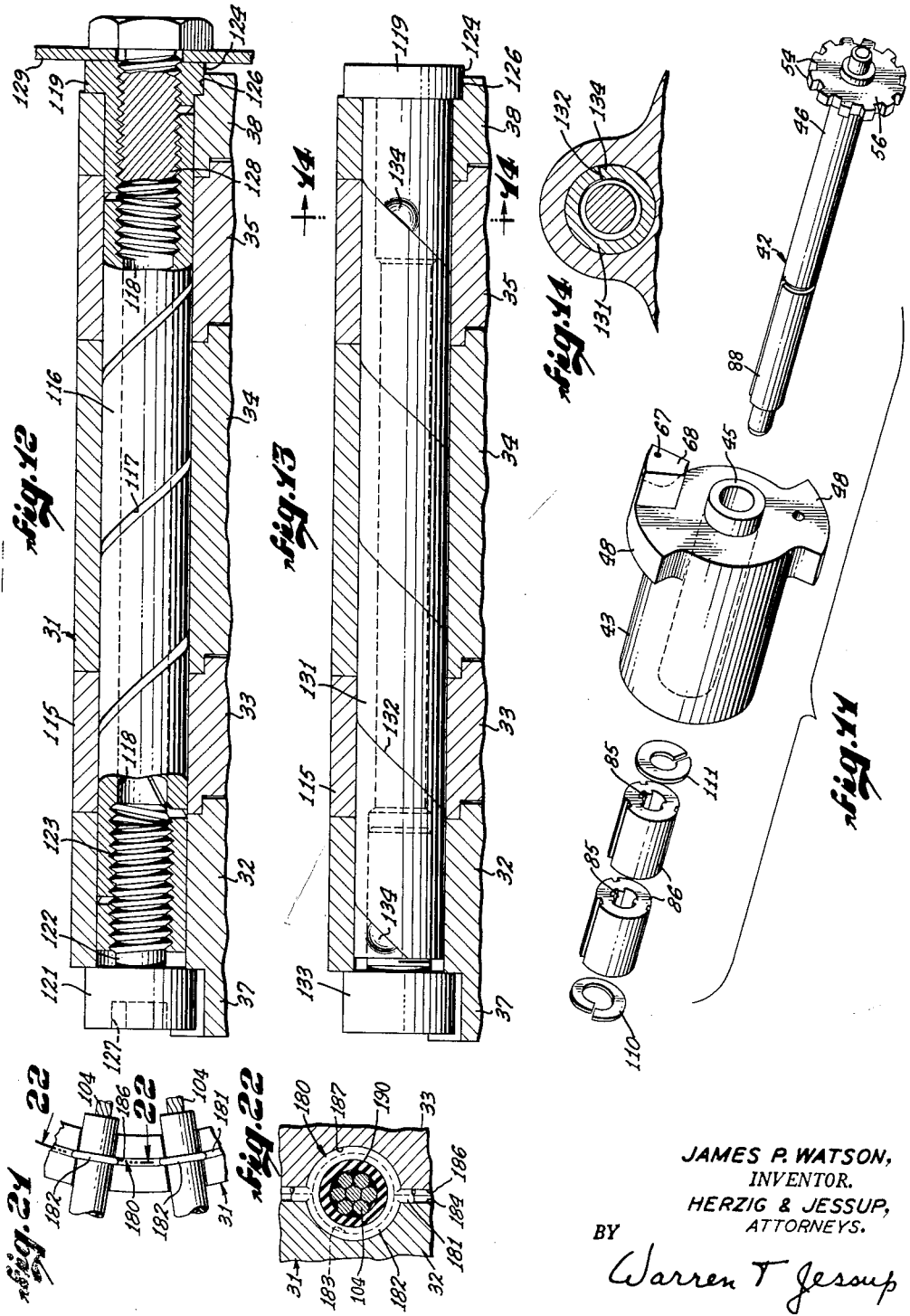

May 9, 1961  J. P. WATSON  2,983,798
STEPPING MOTORS AND SWITCHES
Filed May 28, 1957
5 Sheets-Sheet 5
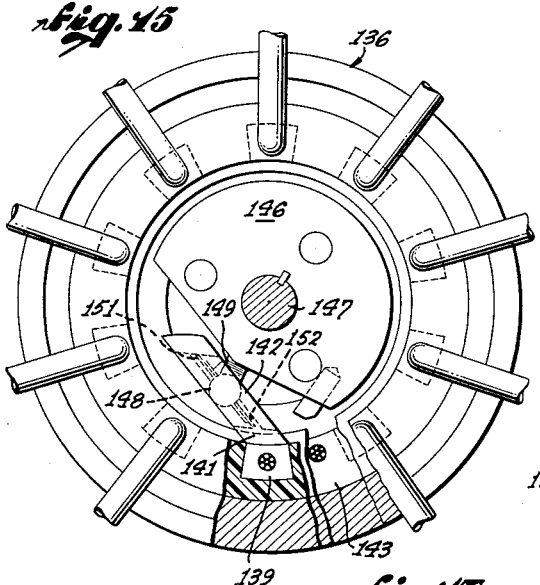
Fig. 15
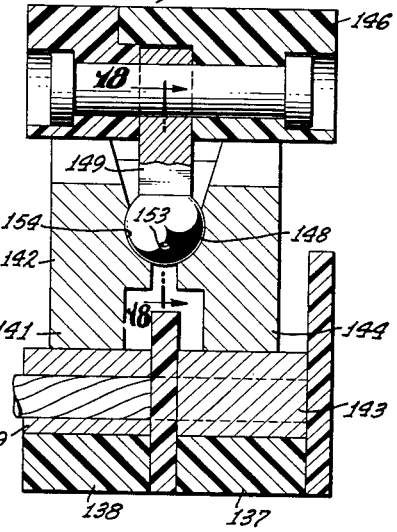
Fig. 16
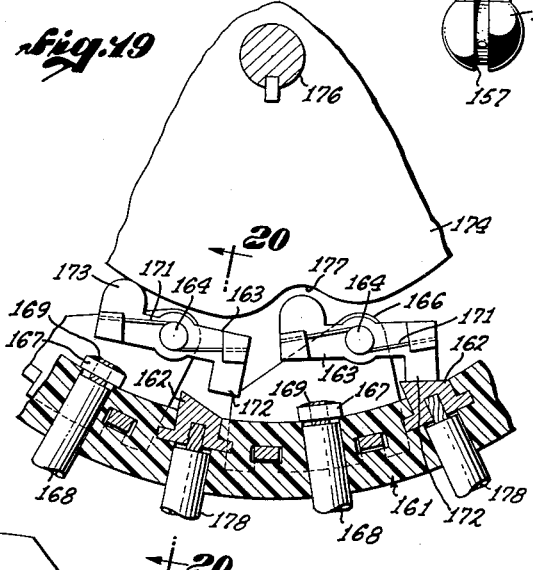
Fig. 19
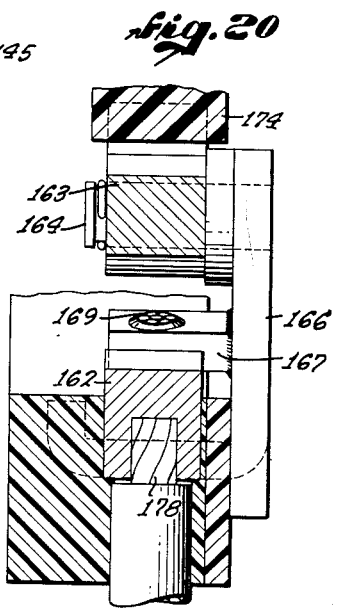
Fig. 20
Fig. 17
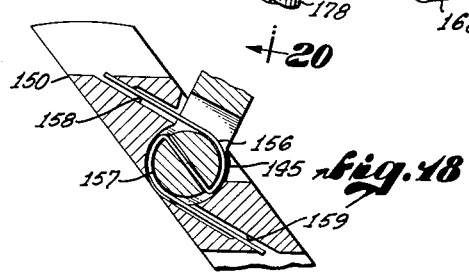
Fig. 18
JAMES P. WATSON,
INVENTOR.
HERZIG & JESSUP,
BY ATTORNEYS.
Warren T. Jessup United States Patent Office 2,983,798
Patented May 9, 1961

2,983,798

STEPPING MOTORS AND SWITCHES

James P. Watson, Whittier, Calif. (59 Waterway Road, Waterway Village, Jupiter, Fla.), assignor of one-half to Joe Davidson, South Gate, Calif.

8 Claims. (Cl. 200—1)

This invention relates to stepping motors and switches, and more particularly to certain advantageous features of a combined stepping motor and rotary switch.

It is an object of this invention to provide an improved switch especially adapted for use with a rotary stepping motor.

In a sliding brush type of contact, where the brush rides alternately and successively against a contact segment and thence against an insulation segment, there is a perennial problem occasioned by the fact that the brush drags tiny particles of insulation across and into the face of the contact segment, and also into its own face, thereby increasing the contact resistance, with consequent arcing and pitting, which further aggravates the problem.

It is an object of this invention to provide in a sliding brush structure of the above type, means for obviating this dispersal of insulating particles into the conducting contact face.

It is another object of this invention to obviate, in a switch means embodying a sliding brush, the inherent problem of having the brush accumulate tiny bits of insulation into its face or surface.

It is a further object of this invention to provide in such a switch structure, means for coping with the uneven wear between the insulation and the conducting contact segments, which ultimately causes the brush to ride up and down in an undulatory fashion with resulting danger of brush bounce, and consequent arcing and pitting.

It is another object of this invention to eliminate undesirable brush bounce, such as would or might result from some accelerations or shocks, either internal or external, in a switch structure.

It is another object of this invention to provide an improved slip ring and commutating segment brush structure of simplified and sturdy construction.

It is a further object of this invention to provide improved means for sealing a casing or housing where a cross-member such as a conduit or conductor passes through the wall of the housing.

It is a further object of this invention to provide an improved assembly means for a casing or a housing involving an improved assembly dowel.

It is a further object of this invention to provide an improved assembly dowel which inherently and resiliently holds two parts of a housing tightly together.

It is another object of this invention to provide an improved assembly dowel which does not have to be held during the turning of a screw or nut.

It is a further object of this invention to provide an improved assembly dowel which has a non-turning head, thereby obviating the requirement for a screwdriver or wrench to hold one end of the dowel, which head also serves as a mounting pad, and as a socket or nut to receive a mounting screw.

It is a further object of this invention to provide an assembly dowel which simultaneously has a non-circular head preventing turning of one end of the dowel, which places the two parts of a casing to be assembled in resilient tight engagement, in which the head serves as a mounting pad, and in which the head also receives a mounting screw.

It is a further object of this invention to provide an assembly dowel having incorporated therein means for inhibiting turning of a mounting or assembly screw threaded into either end of the dowel.

In accordance with these and other objects which will become apparent hereinafter, preferred forms of the present invention will now be described with reference to the accompanying drawings wherein:

Figure 1 is a longitudinal sectional view of a stepping motor and switch embodying features of the present invention;

Figure 2 is a cross-section taken on a line 2—2 of Figure 1;

Figure 3 is a fragmentary perspective view of a brush support structure and brushes embodied in the stepping switch portion of the assembly;

Figure 4 is a fragmentary partially sectioned elevation of a brush structure embodying features of the present invention;

Figure 5 is a fragmentary end view with parts broken away showing the brush structure in one position of operation;

Figure 6 is a cross-section taken on a line 6—6 in Figure 1;

Figure 7 is a fragmentary sectional view taken on a line 7—7 of Figure 6;

Figures 8 and 9 are perspective views taken from different angles, of a stop pawl shown in Figure 6;

Figure 10 is a fragmentary exploded perspective view of a driving pawl shown in Figure 6;

Figure 11 is an exploded perspective view of the rotor and shaft of the present invention;

Figure 12 is a longitudinal sectional view of a dowel, taken along line 12—12 of Figure 2;

Figure 13 is a similar view showing a modified form of dowel for holding the casing of the stepping motor and switch together;

Figure 14 is a cross-section taken on line 14—14 in Figure 13;

Figure 15 is an end view partially sectioned showing another form of brush structure especially adapted for a combination slip ring and commutator assembly;

Figure 16 is a fragmentary section showing the brush structure of Figure 15;

Figure 17 is a fragmentary elevation showing a modified form of ball joint support for the brush structure of Figures 15 and 16;

Figure 18 is a fragmentary sectional view of the brush of Figure 17;

Figure 19 is a fragmentary end elevation partially sectioned of another form of contact structure;

Figure 20 is a fragmentary section taken on line 20—20 of Figure 19;

Figure 21 is a fragmentary view taken in the same plane as Figure 2 and showing a modification embodying the sealing ring feature of the present invention; and Figure 22 is a fragmentary section taken on line 22—22 in Figure 21.

Referring to the drawings, and particularly to Figures 1 and 2, there is illustrated a cylindrical casing 31 formed of a plurality of abutting cylindrical sections 32, 33, 34 and 35. An end wall 37 formed integral with the section 32 closes the left end of the casing 31, and an end wall 38 closes the right end of the casing. Spanning the end walls 37 and 38 and journalled therein by bearings 39 and 41, is a shaft 42, over which is journalled a paramagnetic rotor 43. The rotor 43 includes a non-magnetic bushing 45 pressed therein, which is journalled over the right-hand portion 46 of the shaft 42. The rotor 43 is surrounded by a circumjacent coil 44, which when energized with an electric current, produces an axial flux in the rotor 43. The coil 44 is pressed into the cylindrical casing section 34 and abuts against a transverse wall 50, which has an opening 47 to permit passage of the rotor 43.

Axial flux in the rotor 43 leaves the rotor by means of radial poles 48, which project radially outward into proximity with a pair of complementary stationary poles 49 formed integral with the cylindrical casing section 35.

Whenever the coil 44 is energized, the magnetism in the poles 48 causes them to attempt to align with the stator poles 49. This effects rotation of the rotor 43, which is stopped in the position shown in the Figure 6 by a balanced stop pawl 51 pivoted to the end wall 38 by a pivot pin 52 passing centrally through the pawl 51. The innermost end of the pawl 51 is formed with a tooth 53 which engages one of a plurality of teeth 54 formed around a disc 56 secured firmly to the shaft 42.

The disc 56 is pushed around by a drive pawl 57 pivoted at its center by a pin 58 to the rotor 43. A tooth 59 at the inner end of the pawl 57 engages the disc 56 to push it around through an arcuate stroke of the rotor 43.

At the start of the rotor stroke, the tooth 53 is held out of engagement with the disc 56 by a pin 61 extending outwardly from the transverse face of the rotor 43, which engages a cam surface 62 formed integral with, and extending laterally from, the pawl 51. As the stroke of the rotor 43 progresses, the pin 61 departs from the cam surface 62, allowing a torsion spring 63 to bias the pawl 51 counterclockwise, so that the tooth 53 is in position to engage a tooth 54 and thus stop the shaft 42 and bring to a halt the forward arcuate excursion of the rotor 43.

When the coil 44 is de-energized, the rotor 43 moves back counterclockwise (Figure 6) under the bias of a torsion spring 64 disposed in a circular groove 66 formed in the interior face of the end wall 38. One end of the spring 64 projects into an anchor hole 67 formed in a stop member 68 projecting from one of the poles 48, and the other end of the spring 64 is secured to the end wall 38. The counterclockwise relaxation stroke of the rotor 43 is stopped by engagement of the stop member 68 with a complementary stop member 71 projecting inwardly from the end wall 38. As the rotor 43 oscillates back counterclockwise, the drive pawl 57 pivots out of the way by the action of a cam surface 72 formed on the inner face of the tooth 59 and the tooth 54 on the disc 56. The tooth 59 then drops back into a space between disc teeth under the influence of a torsional biasing spring 73.

As best seen in Figures 6 and 10, the center portion of the spring 73 resides in a diametrical kerf 74 formed in the end of the mounting pin 58. Emerging from the kerf 74, each end of the spring 73 wraps around the pin 58 in a circumferential groove 76 and then departs tangentially from the pin 58 and is turned under a ledge 77 formed integral with the drive pawl 57. As the pawl 57 rocks back and forth in operation of the motor, the wrap-around portion of the spring 73 flexes back and forth to provide the necessary biasing torsion. It will be noted that all of the pawls shown in Figure 6 are completely balanced structurally, so that any accelerative forces such as might result from a sudden shock on the equipment are fully balanced and have no effect on the pawls, tending to drive them neither forward nor back in their engagement with the disc 56.

A holding pawl 78 similar to the drive pawl 57 is also pivotally mounted to the end wall 38 and serves to prevent the disc 56 from being inadvertently driven in the wrong direction, i.e. counterclockwise.

When the rotor 43 drops back to its relaxed position upon de-energization of the coil 44, the disc 56, and hence the shaft 42, can move only in one direction, namely clockwise, which it does upon the next subsequent energization or pulsing of the coil 44.

The coil 44 is maintained pressed against the interwall 50 by a corrugated washer 81 pressed between the coil 44 and the inwardly extending stationary poles 49 of the casing section 35. The washer 81 is not a complete ring, being cut off and turned laterally to form tabs 82 at each end, which hook around the ends of the poles 49. This leaves a free area into which the leads 83, that provide electrical current for the coil 44, may be brought.

The shaft 42 projects leftward beyond the rotor 43 into the left-hand portion of the casing 31 and there serves to actuate one or more rotary switches contained within the single casing 31. In the present instance, two such switches are shown, one being mounted in the casing section 32, and the other in the end casing section 33. Each rotary switch, for example, the switch 84 consists of a non-conductive bushing 86 splined at 85 to the left-hand end 88 of the shaft 42. Splined in turn over the bushing 86 is a conductive balanced switch arm 87, which serves as a brush support means for a pair of opposed conductive brushes 89 and 90. Each brush, for example the brush 89, is rotatably mounted or pivoted at its center to the operating arm 87 by means of an arbor 91 over which the brush is journalled.

The brush 89 bears outwardly into sliding electrical engagement with a plurality of contact members in the form of commutator segments 92 spaced around a circular path centered at the shaft 88. The segments 92 are embedded in a non-conductive ring 93 secured, as by pressing, into the cylindrical casing section 33. In this manner the casing 33 forms a frame means for mounting or supporting the contact members 92 in a circular path, and the brush support arm 87 constitutes a carrier for moving the brush 89 around the same circular path, so that the brush 89 comes successively and repetitively in engagement with the various contact members 92.

Spaced axially from the ring of segments 92 and also mounted in the insulating member or ring 93 is a solid conducting ring 94 having substantially the same internal diameter as the circle or ring formed by the internal surfaces of the contact segments 92. The ring 94 is engaged by an opposite brush 90 in a manner similar to the engagement of the brush 89 and the segments 92, except that the brush 90 is in constant engagement with the ring 94, whereas the segments 92 are separated by intervals of circumferential space.

The circumferential regions between the segments 92 are depressed with respect to the surface of the segments 92 by being formed of a somewhat larger diameter, as best seen in Figure 2.

During the interval when the outer, engaging face of the brush 89 is not in engagement with a contact member or segment 92, it is prevented from moving outward into engagement with the insulation 93 by a laterally projecting guide pin 96 formed integral with the brush 89. The guide pin 96 engages an insulating rail 97 projecting inwardly from, and axially positioned between, the ring 94 and the circle or discrete contact segments 92. In all positions of the brush 89 where the brush face 98 is in engagement with a contact segment 92, the rail 97 is relieved, as shown at 99, so as to allow unhampered bearing of the brush against the contact segments. Similarly, in those positions of the brush 89 where the brush face 98 is opposite the insulation 93, i.e. between segments 92, the laterally spaced projecting pin 96 bears against the rail 97, thereby keeping the face 98 spaced from the insulation 93. In this manner, the brush face 98 is kept out of contact with the spacing insulation 93, and there is thus obviated the troublesome problems occasioned by the dragging of tiny particles of insulation over and into the face of the contact segments or the brush. The rail surfaces 97 are so related to the engaging faces of the contact segments 92 that the guide pin 96 comes into engagement with the rail 97 just before the brush face 98 leaves the contact segment 92, and the brush face 98 comes into engagement with the next successive segment 92 just before the guide pin 96 leaves the rail 97.

The brush 89 is torsionally biased so as to urge the face 98 outwardly into engagement with the contact segments 92 (and the guide pin 96 into engagement with the rail 97), by means of a torsion spring 101, which also serves as a securing member for mounting the brush 89 to the stud shaft 91. The torsional mounting of the brush 89 by the torsion spring 101 is substantially the same as the torsional mounting of the pawl 57 by the spring 73, as best seen by a brief comparison between Figures 3 and 10. Both the brushes 89, 90 and the pawls 57, 51, 78, are of a balanced mounting construction so as to be unaffected by shock or other accelerative forces.

Electric current is carried to the segments 92 from the collector ring 94 through the brushes 90 and 89 and the conducting brush support arm 87. To insure good electrical contact between the brushes and the arm 87, a flexible shunt 102 may be laid in the kerf 103 formed in the head of the mounting stud 91 before insertion of the mounting torsion spring 101. The center of the shunt 102 is spot-welded to the bottom of the kerf 103 and the ends are in turn spot-welded to the brush 89.

As best seen in Figure 5, the lateral guide pin 96, by riding on the rail 97, keeps the brush 89 completely free from engagement with any part that is fixed to the casing 31, except the circle of contact segments 92, thereby preventing dragging of insulation particles into the contacts or brush, and the dragging of conducting particles into the insulation.

As best seen in Figures 1 and 2, the several conductors 104 are brought radially directly into bond with the contact segments 92, passing through the casing 31 at the circumferential joint between the two casing sections 33 and 34. At this joint, the opposed end faces of the sections 33 and 34 are provided with complementary semicircular grooves 106, which when placed together form a complete bore for the passage of the conductors 104. The lead or conductor for the single ring 94 is brought into the casing at the same plane as the leads 104, as shown at 107 in Figure 2, and then is turned at right-angles and passes through the rail 97 (which also serves as an insulating wall between the ring 94 and the ring of segments 92). This structure is shown longitudinally for the conductor 108 of the switch section 109, that is substantially identical to the switch section 84 previously described.

In order to inhibit axial play of the parts mounted on the shaft 42, a snap ring 111 is secured in a groove 112 in the shaft 42, between the two sections 88 and 46. The several bushings corresponding to the bushing 86 of the switch section 84 are then butted end to end and held axially and resiliently by an offset resilient spring washer 110, the outermost end of which bears against the bearing 39 in the end wall 37. The stator parts, i.e. the insulating rings corresponding to the ring 93 are kept axially pressed into place by a corrugated spring washer 113 similar to the shaft spring washer 110 previously described.

In operation, each pulse of current applied to the coil 44 causes the shaft 42 to step through an arc of 36° (clockwise in Figure 6, counterclockwise in Figure 2), and this transfers the brush 89 from one contact segment 92 to the next succeeding segment. Thus a voltage or other signal applied to the conductor 107 is successively distributed to the several commutator conductors 104 of the switch 84. The switch means 109 is similarly stepped around its successive contact segments.

As will be best seen in Figure 1, the stepping motor generally, and particularly the casing 31, consists of a plurality of cylindrical sections which are held together by three longitudinal dowels (116, Figure 2) which reside in ears 115 projecting radially from the casing 31.

Each elongate dowel 116 has a spiral slit 117 extending substantially the full length of the dowel. In the embodiment shown in Figure 12, the slit 117 is given an appreciable width, for reasons which will be explained hereinafter, to form actually a slot. It is preferred to provide the dowel 116 with an axial bore extending through the length thereof, so that the dowel becomes in effect a tube, and the slit 117 extends through the wall of the tube to communicate with the bore 118, for substantially the full length of the slit 117.

The dowel 116 is made of a resilient material such as steel, so that when it is placed under tension, the slit 117 permits the dowel to strain appreciably thereby providing an unusually wide latitude of expansion and contraction of the assembly, without loosening.

The dowel 116 is placed under tension by an integral head 119 formed on the right-hand end of the dowel 116, and the head 121 of an assembly screw 122 which is threaded into threads 123 on the left-hand end of the bore 118. The two heads 121 and 119 press against the respective end members or walls 37, 38 and serve to hold the casing 31 together longitudinally and under a resilient force. The dowel head 119 is formed with a flat 124, which resides against a corresponding flattened surface 126 formed on the end plate 38. This prevents the dowel 116 from turning as the screw 122 is screwed into place by means of a wrench inserted into a hexagonal socket 127.

At the right-hand end, the bore 118 is also threaded to receive a mounting screw 128 that secures the stepping motor to a mounting member such as a plate 129. The head 119 extends slightly beyond the surface of the end wall 38 as shown in Figure 12, to form a mounting pad. The three dowels thus constitute not only assembly means for the casing 31, but also form three equally spaced mounting pads by means of which the stepping motor may be mounted to an uneven base without distortion of the case.

In the embodiment shown in Figure 12, both of the screws 128 and 122 have right-hand threads, and the slit or slot 117 is also right-hand. Thus, as the screws 122 and 128 are screwed into place there is a tendency to unwind the spiral and thereby facilitate insertion of the screws. Conversely, any attempt on the part of the screws 122 or 128 to work themselves out by unscrewing is resisted by a tightening action of the spiral around the screws. It is for this reason that the slits 117 are given a slight width, so that there is operating room for the spiral to effect a tightening action around screws.

(Note that slit 117 is of the same hand as the screws 128 and 122, namely right-hand.)

In Figure 13, there is shown a modified form of dowel 131 having a slit 132 formed therein which is of no appreciable width; that is to say, when the tube forming the dowel 131 is unstressed, the walls of the slit 132 touch each other. As in the dowel shown in Figure 12, the threads formed in each end of the tube 131 are of right-hand, but it will be noted that the slit 132 is of left-hand.

Like the dowel 116, the dowel 131 is also placed under resilient tension by the screwing in of the assembly screw 133. Since the slit 132 is of opposite hand than the threads in the end of the tube, there is a tendency for the spiral tube to wrap itself tightly around the screws as they are screwed into the tube. However, this tendency is blocked by the fact that the slit 132 has no appreciable width, and therefore the tube cannot ensmall appreciably as the screws are threaded in.

The dowel 131 is somewhat more rigid than the dowel 116, and thus permits a closer and tighter fit in the casing 31.

To inhibit the screws in the end of the dowel from coming loose, the edge of the slit 132 is dimpled inwardly as shown at 134 to form a projection that frictionally engages the screw threads and inhibits unscrewing thereof.

Another form of brush structure embodying the balanced acceleration-proof characteristic of the brush 89 is shown in Figures 15 and 16. In Figure 15, the casing 136 constitutes a frame for supporting a pair of ring structures 137 and 138. The ring structure 138 is of insulating material and has embedded therein a plurality of inwardly facing contact segments 139 which are successively engaged by one arm 141 of a brush 142. The ring structure 137 is of insulating material and supports a continuous conducting ring 143 having an internal diameter substantially the same as the internal diameter formed by the inner surfaces of the several contact segments 139. Sliding against the internal face of the ring 143, is a corresponding arm 144 of the brush 142.

The brush 142 is universally mounted to a brush support 146 which is keyed to and rotated by the shaft 147. This universal mounting is effected by means of a ball 148 formed on the end of a projecting post 149 secured to the brush support 146.

The two arms 141 and 144 are biased into sliding engagement with their respective stationary ring structures by means of a spring wire 151 bearing against the brush in a longitudinal bore 152 and passing centrally through a bore 153 formed in the ball 148. The ball 148 resides in a socket 154 formed centrally in the brush 142.

With the structure shown, the brush 142 is free to rock back and forth laterally, thereby maintaining even pressure against the two ring structures 139 and 143.

If desired, the bias of the brush 150 may be fortified by wrapping the biasing spring 156 around the ball 145 in the manner shown in Figure 18. The wrap-around portions of the spring 156 resides in a groove 157 (Fig. 17) formed in the ball 145 and the two bores 158 and 159 are obliquely formed in the brush 150 as shown in Figure 18. The flexing action of the spring 156 is generally similar to that of the spring 73 described hereinbefore in connection with Figure 10.

Another form of the present invention embodying the balanced contact structure is shown in Figures 19 and 20. In this figure, the insulating casing 161 constitutes a frame for holding a plurality of individual contact segments 162 each of which has associated therewith its own contact arm 163 balanced and pivoted at the center thereof by means of an arbor 164. The arbor 164 is secured to and projects laterally from a mounting plate 166 having a projecting tab 167 through which extends a stranded conductor 168 which is welded or soldered thereto at 169.

The arm 163 is torsionally biased by a spring 171 which urges the moving contact 172 on the arm 163 into contact with the contact segment 162. The opposite or inner end of the arm 163 is formed with a boss 173 which is actuated by a cam 174 keyed to and rotated by the shaft 176. As the cam 174 rotates, a depressed portion 177 on the periphery thereof comes opposite the successive bosses 173, allowing that particular switch arm 163 to make contact with the contact 162 and thereby close a circuit between the conductor 168 and the conductor 178 of that particular switch structure.

As in the other embodiments described, this switch too has the advantage that it is virtually free from being affected by shock and other accelerations, because all moving parts are balanced against shock and therefore against contact bounce due to external forces.

In order to seal two adjacent cylindrical casing sections, as for example 32 and 33, to each other, and also seal them to the various conductors 104 where the conductors enter the casing, a sealing ring 180 constructed in accordance with the present invention is illustrated in Figures 21 and 22. This ring consists of a major ring 181 made of pliant material and formed about a major axis which coincides with the axis of the shaft 42. At each point where a conductor 108 is to penetrate the casing 31, a minor ring 182 is formed in the major ring 181 and made of diameter appreciably smaller than the diameter of the major ring. The minor ring is disposed substantially on the surface of an imaginary cylinder formed about the major axis, i.e. the shaft 42.

The internal diameter of the minor ring 182 is made slightly smaller than the external diameter of the lead 104, so as to grippingly engage the lead as it passes through the minor ring 182.

Each of the opposed end faces of the joined cylindrical casings 32 and 33 is formed with complementary semicircular cross bores 183, which together form a single circular bore for reception and passage of the lead 104. Grooves 184 and 186 are formed in the respective end faces or edges of the cylinders 32 and 33, and extend continuously around the faces including the faces of the semi-circular bores, as shown at 187 in Figure 22.

Where the lead 104 passes through the wall of the casing 31, the interspace between the strands of the conductors is filled with solder as shown at 190 in Figure 22.

The relative dimensions of the pliant ring or sealing member 180 and the grooves 184 and 186 are such that all portions of the pliant ring 180 are compressed as the two sections 32 and 33 are drawn tightly into engagement with each other by tightening action on the several dowels 116.

In this way, the single sealing member 180 serves the double function of sealing the cylindrical casings 32 and 33 to each other, and also to the several leads or conductors 104 where they enter the casing 31.

While the instant invention has been shown and described herein in what is conceived to be the most practical and preferred embodiments, it is recognized that departures may be made therefrom within the scope of the invention, which is therefore not to be limited to the details disclosed herein, but is to be accorded the full scope of the claims.

What is claimed is:

1. Brush structure comprising frame means, brush support means, means for mounting said frame means and said brush support means for movement relative to each other along a predetermined path, brush means movably mounted to said support means and movable with respect to said frame means along said path, a contact member mounted to said frame means and engageable by a face of said brush means during a portion of the relative movement between said brush means and said frame, rail means mounted to said frame means along the remainder of said path of relative movement, guide means spaced from said face and fixed with respect to said brush means for engaging said rail means over that portion of said path of relative movement during which said brush means is not in engagement with said contact means, and means for biasing said brush means toward said contact means.

2. Structure in accordance with claim 1 wherein said face is completely free of engagement from any part that is fixed with respect to said frame means, except said contact member, thereby relieving said face of all interengaging surfaces except the interengagement between said contact member and said face.

3. Apparatus in accordance with claim 1 wherein said path is circular and said brush support means comprises a member rotatably mounted to said frame means.

4. Brush structure comprising frame means, a brush support member, means for mounting said frame means and said brush support member for relative rotation, a brush member pivoted at its center to said brush support member, a contact member mounted to said frame means and engageable by a face of said brush member during a portion of the relative movement between said brush support member and said frame means, rail means mounted to said frame means, guide means spaced from said face and fixed with respect to said brush member for engaging said rail means during those portions of said relative rotation during which said brush member is not in engagement with said contact member, and double-torsion spring means for urging both ends of said brush member in a similar rotative direction, thereby to bias one end of said brush member against said contact member.

5. Apparatus in accordance with claim 4 comprising a plurality of contact segments and guide rails spaced alternately around the circular path on said frame means, whereby said brush face engages said contact segments and said guide means engages said rail means alternately.

6. Apparatus in accordance with claim 5 wherein said rail means is laterally offset from said contact segments with respect to said path of relative movement.

7. Electrical contact structure comprising: a frame, an electrical contact member secured to said frame, a rotor pivotally mounted to said frame, a contact arm balanced and pivotally mounted at the center thereof to said rotor, one end of said contact arm being engageable with said contact member, means for rotationally biasing said said arm about its pivotal mounting to resiliently urge said end into engagement with said contact member, whereby upon rotation of said rotor, relative movement between said contact arm and said contact member is effected, thereby to open and close a circuit between said contact arm and said contact member.

8. Electrical contact structure comprising a frame, an electrical contact member secured to said frame, a rotor pivotally mounted to said frame, a contact arm balanced and pivotally mounted at the center thereof to said rotor, the pivot point of said contact arm being spaced appreciably from the pivot axis of said rotor, one end of said contact arm being engageable with said contact member, means for rotationally biasing said arm about its pivotal mounting to resiliently urge said end into engagement with said contact member, whereby upon rotation of said rotor, relative movement between said contact arm and said contact member is effected, thereby to open and close a circuit between said contact arm and said contact member.

References Cited in the file of this patent

UNITED STATES PATENTS

| | | |
|---|---|---|
| 570,418 | Warts | Oct. 27, 1896 |
| 916,649 | Backe | Mar. 30, 1909 |
| 1,214,309 | Jillson | Jan. 30, 1917 |
| 1,285,786 | Nies | Nov. 26, 1918 |
| 1,469,032 | Barker | Sept. 25, 1923 |
| 2,201,881 | Bryant | May 21, 1940 |
| 2,418,616 | Batcheller | Apr. 8, 1947 |
| 2,554,506 | Schwarz | May 29, 1951 |
| 2,615,741 | Nathan | Oct. 28, 1952 |
| 2,680,163 | Besserer | June 1, 1954 |
| 2,688,506 | Bakker | Sept. 7, 1954 |
| 2,765,376 | Palmer | Oct. 2, 1956 |
| 2,784,637 | Smisko | Mar. 12, 1957 |
| 2,789,457 | Allen | Apr. 23, 1957 |
| 2,795,660 | Keller | June 11, 1957 |
| 2,804,527 | Snyder | Aug. 27, 1957 |

FOREIGN PATENTS

| | | |
|---|---|---|
| 330,355 | Great Britain | June 12, 1930 |